United States Patent [19]

Soled et al.

[11] Patent Number: 5,648,589

[45] Date of Patent: Jul. 15, 1997

[54] GROUP VIII METAL CONTAINING TUNGSTEN OXIDE SILICA MODIFIED ZIRCONIA AS ACID CATALYST

[75] Inventors: Stuart L. Soled, Pittstown; William E. Gates, Lebanon Township, both of N.J.; Enrique Iglesia, Moraga, Calif.

[73] Assignee: Exxon Research & Engineering Company, Florham Park, N.J.

[21] Appl. No.: 426,378

[22] Filed: Apr. 21, 1995

Related U.S. Application Data

[60] Division of Ser. No. 143,423, Oct. 26, 1993, Pat. No. 5,422,327, which is a continuation-in-part of Ser. No. 935,800, Aug. 27, 1992, abandoned.

[51] Int. Cl.$^6$ ............................................. C07C 5/13
[52] U.S. Cl. ........................ 585/734; 585/750; 585/751
[58] Field of Search ........................... 585/734, 750, 585/751

[56] References Cited

U.S. PATENT DOCUMENTS

| | | | |
|---|---|---|---|
| 3,755,146 | 8/1973 | Harris et al. | 208/112 |
| 3,857,901 | 12/1974 | Dowden et al. | 260/668 A |
| 4,005,048 | 1/1977 | Dowden et al. | 252/432 |
| 4,233,139 | 11/1980 | Murrell et al. | 208/112 |
| 4,240,934 | 12/1980 | Mierville | 252/466 PT |
| 4,284,531 | 8/1981 | Simpson et al. | 252/465 |
| 4,440,872 | 4/1984 | Grenoble et al. | 502/242 |
| 4,692,428 | 9/1987 | Murrell et al. | 502/254 |
| 4,837,193 | 6/1989 | Akizuki et al. | 502/242 |
| 4,918,041 | 4/1990 | Hollstein et al. | 502/217 |
| 4,956,519 | 9/1990 | Hollstein et al. | 585/751 |
| 5,120,898 | 6/1992 | Baba et al. | 585/750 |

FOREIGN PATENT DOCUMENTS

| | | |
|---|---|---|
| 0495534 | 7/1992 | European Pat. Off. . |
| 462801 | 11/1989 | Japan . |

*Primary Examiner*—Glenn A. Caldarola
*Assistant Examiner*—Thuan D. Dang
*Attorney, Agent, or Firm*—Estelle C. Bakun; Jay Simon

[57] ABSTRACT

The invention is directed to a catalyst composition comprising a Group VIII metal, preferably a Group VIII noble metal, and a zirconia support impregnated with silica and tungsten oxide and its use in an isomerization process.

3 Claims, 1 Drawing Sheet

GROUP VIII METAL CONTAINING TUNGSTEN OXIDE SILICA MODIFIED ZIRCONIA AS ACID CATALYST

This is a division of application Ser. No. 143,423 filed Oct. 26, 1993, now U.S. Pat No. 5,422,327 which is a CIP of Ser. No. 07/935,800 Aug. 27, 1992 now abandoned.

FIELD OF THE INVENTION

Isomerization catalysts disclosed in the prior art continue to suffer major disadvantages when applied, for example, to long chain hydrocarbons e.g., $C_7+$. For instance, large amounts of byproducts, consisting predominantly of cracked hydrocarbon materials, form in prior art isomerization methods along with the desired isomerate product. Cracking decreases the amount of long chain paraffins available for isomerization, thereby reducing the ultimate yield.

SUMMARY OF THE INVENTION

Applicants have discovered that a catalyst composition comprising a Group VIII metal, preferably a Group VIII noble metal, and a zirconia support having both silica and tungsten oxide simultaneously present produces a solid acid catalyst that behaves differently from one having a Group VIII metal with either silica or tungsten oxide alone on the zirconia support. At 450° C. Group VIII noble metal-containing zirconia impregnated with silica alone is not active for $nC_7$ isomerization compared with either Group VIII noble metal-containing tungsten oxide impregnated zirconia or Group VIII noble metal-containing zirconia impregnated with both tungsten oxide and silica simultaneously. The tungsten oxide and silica impregnated Group VIII noble metal-containing zirconia has comparable activity at 350° C. to a tungsten oxide impregnated zirconia at 250° C.; however, the selectivity to cracked product is substantially higher on zirconia impregnated with only tungsten oxide than on zirconia impregnated with both silica and tungsten oxide. Therefore, applicants have discovered a new catalyst which can act as a solid acid catalyst useful in isomerization reactions and leading to much lower selectivity to undesirable cracked products.

The invention is hence directed to a catalyst composition consisting of a supported Group VIII metal, preferably a Group VIII noble metal, and a support impregnated with a mixture of silica and tungsten oxide wherein the sole support is zirconia.

The invention is further directed to the use of the catalyst composition in an isomerization reaction.

DETAILED DESCRIPTION

Figure 1:
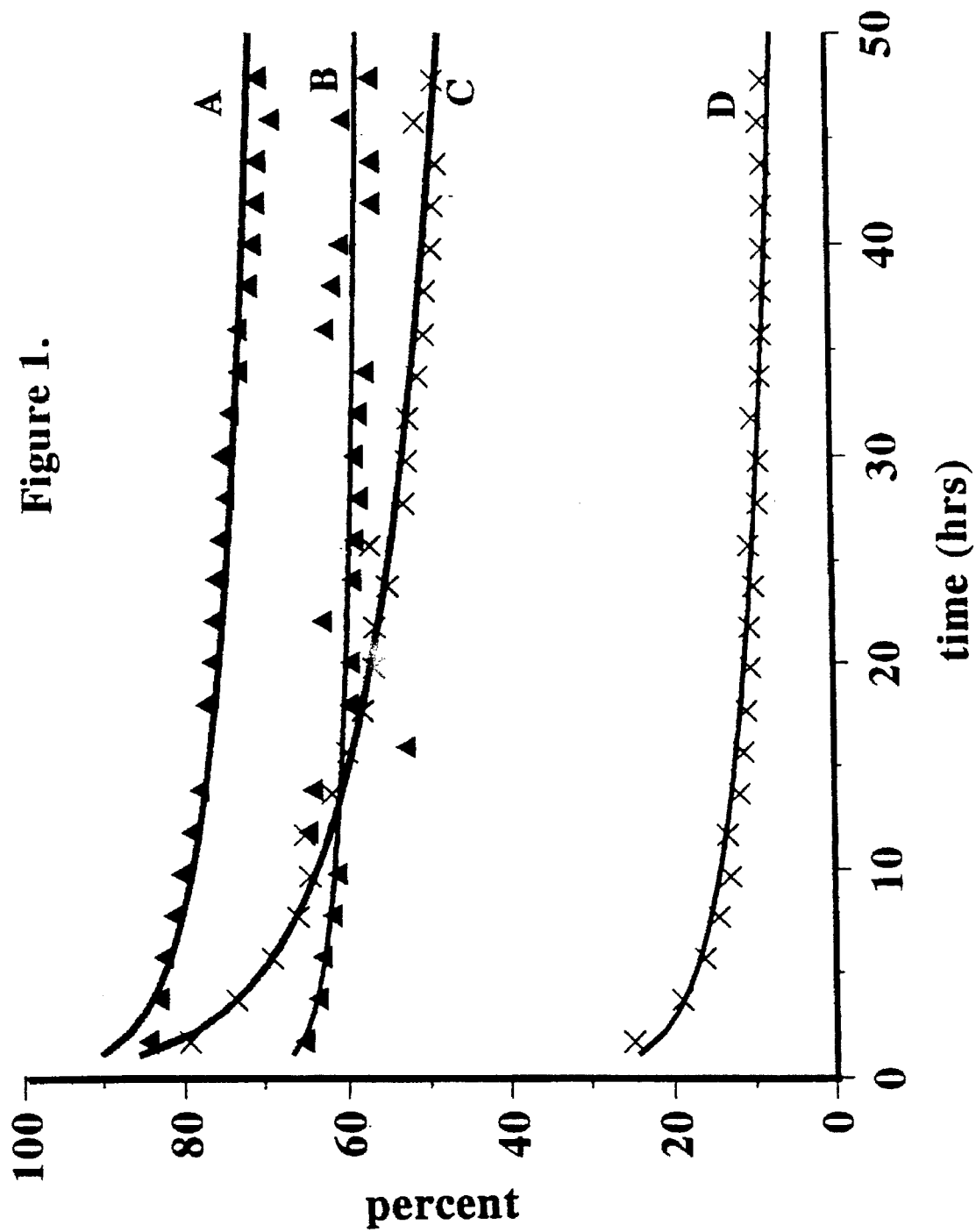
FIG. 1 shows the conversion (line A) and cracking (line B) selectivity in an isomerization reaction, of a zirconia support having impregnated therein tungsten oxide alone and containing 0.5% platinum and run at 250° C. and the conversion (line C) and cracking selectivity (line D) of a zirconia support having both silica and tungsten oxide simultaneously impregnated therein and containing 0.5% platinum and run at 350° C. The figure shows that the impregnation of both tungsten oxide and silica affords a catalyst with lower cracking selectivity and comparable conversion.

The catalysts of this invention may be prepared by techniques well known in the art, such as incipient wetness, impregnation, etc., the choice being left to the practitioner. When using the impregnation technique, the impregnation solution is contacted with the support material for a time sufficient to deposit the precursor material onto the support either by selective adsorption or alternatively, the excess solvent may be evaporated during drying, leaving behind the precursor salt. Advantageously, incipient wetness techniques may also be used. The choice of catalyst preparation method is left to the practitioner.

The catalyst of the present invention contains zirconia as the sole support which may be prepared from precipitated zirconium hydroxide. For example, $ZrOCl_2 \cdot 8H_2O$ can be dissolved in water and $Zr(OH)_4$ precipitated with ammonium hydroxide. Other compounds reacting to produce $Zr(OH)_4$ may also be used. The solid $Zr(OH)_4$ is then separated, for example, by filtration, washed and dried. A Group VIII metal may then be incorporated, for example, via the incipient wetness technique using a solution of chloroplatinic acid. The amount of Group VIII metal incorporated can range from about 0.01 to 10 wt %, preferably 0.01–2 wt %, and most preferably from 0.3 to 1.0 wt %.

The Group VIII metal may be selected from any of the Group VIII metals, and mixtures thereof. Preferably the Group VIII metal will be a noble metal selected from platinum, palladium, ruthenium, iridium, osmium, and mixtures thereof.

Tungsten oxide and silica may then be impregnated into the support. Tungsten oxide and silica may be incorporated directly or any compounds of tungsten and silicon capable of forming tungsten oxide and silica upon calcination may be used to provide these oxides. Preferably the tungsten oxide and silica will be incorporated simultaneously. For example, a solution containing ammonium metatungstate as the source or precursor of tungsten oxide, and aqueous colloidal silica can be prepared and the $Zr(OH)_4$ or $Zr(OH)_4$ containing Group VIII metal immersed therein.

Generally about 5 to about 25 wt %, preferably about 10 to about 15 wt % tungsten oxide will be added to the support. The amount of silica impregnated will range from about 1 to about 10 wt %, preferably about 3 to about 5 wt % based on the catalyst composition.

Following impregnation of the oxides, or oxide precursors, and the Group VIII metal, the catalyst is dried and calcined to convert the $Zr(OH)_4$ to zirconia and the oxide precursors to oxides. Drying is conducted at temperatures of about 100° C. to about 150° C. and calcination at temperature of about 300° C. to about 900° C. Preferably calcination temperatures will be about 400° C. to about 600° C. Calcination time will be at least 1 hour, preferably about 4 hours.

The impregnation of Group VIII metal, tungsten oxide and silica can be performed simultaneously or in any sequence. Though it is preferably to incorporate the Group VIII metal first, the order of addition is merely a matter of choice.

The present invention does not utilize silica as a support material. Instead, the silica is employed in a manner which is believed to modify the zirconia support. Typically, one would expect addition of silica to increase catalyst acidity thereby leading to increased cracking. Unexpectedly, applicants have observed decreased cracking with the instant catalyst.

The differences between silica bulk substitutions and silica impregnations into zirconia have been demonstrated in the Catalyst Supports: Chemistry, Forming and Characterization Symposium presented before the Division of Petroleum Chemistry Inc., ACS N.Y. Meeting, Aug. 25–30, 1991, Volume 36, No. 3, July 1991, pp. 480–485. This paper illustrates the differences between silica and zirconia where both are acting as support materials and silica impregnated onto zirconia where different results are obtained.

The catalysts of the present invention are particularly useful for an isomerization reaction. The catalysts may be contacted with a $C_5+$ feedstream. Preferably a feedstream comprising $C_5$ to $C_{10}$ paraffins will be used. Isomerization can be conducted at temperatures below about 400° C., 100 to 3000 psi $H_2$, 4/1 to 10/1 $H_2$/n-paraffin, and 0.1 to 10.0 LHSV, preferably the reaction is carried out at temperatures between about 300° C. and 400° C. 5/1 $H_2$/n-paraffin, and 1 to 2 W/W/hr.

The invention is illustrated by the following example which is not limiting in any way.

EXAMPLE 1

Preparation of Platinum Solution:

6.25 g of chloroplatinic acid containing 40% platinum, were dissolved in and diluted to one liter with water. The resultant solution contains 0.05 g Pt/20 cc of solution.

Preparation of $Zr(OH)_4$:

360 g of $ZrOCl_2 \cdot 8H_2O$ were dissolved in 2800 cc of water. Concentrated ammonium hydroxide solution (~14M) was added with stirring at which point a precipitate forms. The addition of ammonium hydroxide solution is continued until the pH of solution reaches ~10. The resulting slurry is then left to settle for two hours. The precipitate is filtered, washed with distilled water twice, then with water containing a sufficient quantity of ammonium hydroxide to keep the pH at ~10. In order to remove any residual chloride, the solid is then reslurried into a 1M solution of ammonium hydroxide, the slurry is heated to 60° C. stirred and after one hour filtered and washed with water. The solid is then dried at 100° C. overnight.

Preparation of $Zr(OH)_4$:

40 g of $Zr(OH)_4$ were immersed into 80 cc of the chloroplatinic acid solution, stirred and mixed for 5 minutes, filtered and dried overnight at 110° C.

Preparation of $Pt/ZrO_2/WO_3$:

A solution was prepared containing 4 g of ammonium metatungstate (Sylvania 92.2% $WO_3$) dissolved in 40 cc of water. 20 g of $Pt/Zr(OH)_4$ was immersed into this solution, stirred and mixed for five minutes, filtered and dried at 110° C. overnight. This was then calcined at 600° C. for three hours in air.

Preparation of $Pt/ZrO_2/(WO_3—SiO_2)$, platinum on zirconia containing tungsten oxide and silica.

A solution was prepared by dissolving 2 g of ammonium metatungstate (92.2% $WO_3$) and 3.5 g of Ludox HS-40 colloidal silica (Dupont) into 20 cc of water. 10 g of $Pt/Zr(OH)_4$ was immersed into this solution, stirred and mixed for 5 minutes, filtered and dried at 110° C. overnight. This was then calcined at 600° C. for three hours in air.

The $Pt/ZrO_2/WO_3$ and $Pt/ZrO_2/(WO_3—SiO_2)$ catalysts were then compared in an isomerization reaction using a n-heptane feed. The results, which are depicted in FIG. 1, show that the silica tungsten oxide mixture (line C) has comparable activity at 350° C. relative to the tungsten oxide only zirconia catalyst (line A) run at 250° C. However, the selectivity to cracked product is substantially higher on the tungsten oxide only zirconia (line B) than on the tungsten oxide-silica zirconia (line D).

As used herein, conversion means the fraction expressed as % of feed converted, selectivity means the wt % of product formed/wt % of feed converted measured in %, activity is a measure of the amount in grams of feed converted per gram of catalyst per unit time.

What is claimed is:

1. A catalytic isomerization process comprising contacting a $C_5+$ feed, under isomerization conditions, with a catalyst composition consisting of a Group VIII metal and a zirconia support impregnated with tungsten oxide and silica.

2. A catalytic isomerization process according to claim 6 wherein said $C_5+$ feed comprises $C_5$ to $C_{10}$ paraffins.

3. A catalytic isomerization process according to claim 1 wherein said Group VIII metal is a Group VIII noble metal.

* * * * *